(12) United States Patent
Shah et al.

(10) Patent No.: US 10,493,698 B2
(45) Date of Patent: Dec. 3, 2019

(54) METHOD OF MANUFACTURING A WORKPIECE

(71) Applicant: GM GLOBAL TECHNOLOGY OPERATIONS LLC, Detroit, MI (US)

(72) Inventors: Bhavesh Shah, Troy, MI (US); Chris Wisniewski, Oshawaw (CA); Mark A. Voss, Richmond, MI (US); Lane G. Lindstrom, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 6 days.

(21) Appl. No.: 15/655,121

(22) Filed: Jul. 20, 2017

(65) Prior Publication Data

US 2019/0022951 A1    Jan. 24, 2019

(51) Int. Cl.

| | |
|---|---|
| B29C 65/02 | (2006.01) |
| C08J 5/04 | (2006.01) |
| B29C 65/24 | (2006.01) |
| B29C 65/70 | (2006.01) |
| B32B 37/06 | (2006.01) |
| B32B 38/18 | (2006.01) |
| B29C 48/155 | (2019.01) |
| B29C 48/15 | (2019.01) |
| B29C 48/30 | (2019.01) |

(Continued)

(52) U.S. Cl.
CPC .......... *B29C 65/028* (2013.01); *B29C 48/155* (2019.02); *B29C 65/245* (2013.01); *B29C 65/70* (2013.01); *B32B 37/06* (2013.01); *B32B 38/1808* (2013.01); *C08J 5/042* (2013.01); *C08J 5/043* (2013.01); *B29C 48/0022* (2019.02); *B29C 48/03* (2019.02); *B29C 48/07* (2019.02); *B29C 48/15* (2019.02); *B29C 48/30* (2019.02); *B29C 48/303* (2019.02); *B29C 48/307* (2019.02); *B29C 48/35* (2019.02); *B29C 48/79* (2019.02); *B29C 2793/0027* (2013.01); *B32B 2038/1891* (2013.01)

(58) Field of Classification Search
CPC ..... B29C 47/02; B29C 47/126; B29C 31/085; B29C 31/004; B32B 38/1808
USPC ............................................ 156/244.11–245
See application file for complete search history.

(56) References Cited

U.S. PATENT DOCUMENTS 4,181,551 A * 1/1980 Ward .................... B29B 13/023
156/199
4,486,172 A * 12/1984 Dunning ............... B29B 13/023
219/388

(Continued)

FOREIGN PATENT DOCUMENTS

CA          2052964 A1 *  4/1992  ............. B29C 51/12

*Primary Examiner* — Nicole M. Buie-Hatcher
(74) *Attorney, Agent, or Firm* — Quinn IP Law

(57) ABSTRACT

A method of manufacturing a workpiece includes heating a pre-formed blank of a first fiber reinforced thermoplastic material in an oven. A second fiber reinforced thermoplastic material is heated in an extruder. The second fiber reinforced thermoplastic material is extruded from the extruder, within the oven, to form an extrudate. The extrudate is positioned on the pre-formed blank of the first fiber reinforced thermoplastic material, within the oven, to form a composite blank. The extrudate may be formed into a shape before being positioned onto the pre-formed blank, after being positioned onto the pre-formed blank. The composite blank may then be transferred to a final shaping station.

17 Claims, 4 Drawing Sheets

(51) Int. Cl.
  *B29C 48/305* (2019.01)
  *B29C 48/03* (2019.01)
  *B29C 48/07* (2019.01)
  *B29C 48/00* (2019.01)
  *B29C 48/79* (2019.01)
  *B29C 48/35* (2019.01)

(56) References Cited

U.S. PATENT DOCUMENTS

| | | | |
|---|---|---|---|
| 6,722,872 B1* | 4/2004 | Swanson | B29C 41/36 425/225 |
| 2004/0253429 A1* | 12/2004 | Polk, Jr. | B29C 43/34 428/292.1 |
| 2005/0161865 A1* | 7/2005 | Bristow | B29C 51/004 264/511 |
| 2007/0071902 A1* | 3/2007 | Dietrich | B29C 64/106 427/402 |
| 2012/0028006 A1* | 2/2012 | Yamaguchi | B32B 27/32 428/212 |
| 2012/0269999 A1* | 10/2012 | Kind | B29C 31/085 428/34.1 |
| 2014/0265012 A1* | 9/2014 | Ghalambor | B29C 48/92 264/210.1 |
| 2015/0104633 A1* | 4/2015 | Blanchard | B29C 31/004 428/297.4 |
| 2015/0290875 A1* | 10/2015 | Mark | B29C 70/20 264/138 |
| 2018/0356118 A1* | 12/2018 | van Tooren | F24F 13/0281 |

* cited by examiner

METHOD OF MANUFACTURING A WORKPIECE

INTRODUCTION

The disclosure generally relates to a method of manufacturing a fiber reinforced thermoplastic workpiece, and an oven therefor.

Fiber reinforced thermoplastic components are generally manufactured by placing a sheet of virgin fiber reinforced thermoplastic material in an oven, whereby the sheet is heated to nearly the melting point of the thermoplastic, at which time the heated sheet is transferred to a final shaping station, such as a die or form. The sheet is formed in the die, and excess material from the sheet is removed. This process produces a lot of scrap material, and limits the shapes that may be manufactured to those that may be formed from sheet stock.

SUMMARY

A method of manufacturing a workpiece is provided. The method includes heating a pre-formed blank of a first fiber reinforced thermoplastic material in an oven. A second fiber reinforced thermoplastic material is heated in an extruder. The second fiber reinforced thermoplastic material is extruded from the extruder to form an extrudate. The extrudate is positioned on the pre-formed blank of the first fiber reinforced thermoplastic material to form a composite blank. The composite blank is then transferred to a final shaping station.

In one aspect of the method of manufacturing the workpiece, the second fiber reinforced thermoplastic material is extruded in the oven.

In another aspect of the method, the extrudate is positioned on the preformed blank within the oven.

In one embodiment of the method, the extrudate of the second fiber reinforced thermoplastic material is extruded from the extruder directly onto the pre-formed blank of the first fiber reinforced thermoplastic material. In another embodiment of the method, the extrudate of the second fiber reinforced thermoplastic material is formed into a shape before being placed onto the pre-formed blank of the first fiber reinforced thermoplastic material.

In one aspect of the method of manufacturing the workpiece, the extrudate of the second fiber reinforced thermoplastic material is formed into a pre-form, within the oven.

In one embodiment, the extrudate may be formed into the pre-form before positioning the extrudate on the pre-formed blank of the first fiber reinforced thermoplastic material. In another embodiment, the extrudate may be formed into the pre-form after positioning the extrudate on the pre-formed blank of the first fiber reinforced thermoplastic material.

Another aspect of the method, forming the extrudate into the pre-form includes forming the extrudate into a sheet having a substantially uniform thickness. The sheet may then be trimmed into a pre-defined shape. Another aspect of the method includes positioning the pre-defined shape of the extrudate on the pre-formed blank of the first fiber reinforced thermoplastic material.

In one aspect of the method, the first fiber reinforced thermoplastic material and the second fiber reinforced thermoplastic material each include one of glass fibers or carbon fibers.

In another aspect of the method, the first fiber reinforced thermoplastic material and the second fiber reinforced thermoplastic material may each include one of an amorphous or crystalline thermoplastic material reinforced with a fiber or powder compatible with the respective thermoplastic material.

In one embodiment of the method, the second fiber reinforced thermoplastic material may include virgin material. In another embodiment of the method, the second fiber reinforced thermoplastic material is recycled material.

An oven for manufacturing a fiber reinforced thermoplastic workpiece is also provided. The oven includes a structure defining a heating chamber. A conveyor system passes through the heating chamber. The conveyor system is operable to move a pre-formed blank of a first fiber reinforced thermoplastic material through the heating chamber. An extruder has a heated hopper that is operable to heat a second fiber reinforced thermoplastic material. The extruder further includes a die disposed within the heating chamber. The die is operable to extrude the second fiber reinforced thermoplastic material onto the pre-formed blank of the first fiber reinforced thermoplastic material within the heating chamber.

In one aspect of the oven described herein, a forming station is disposed within the heating chamber. The forming chamber is operable to form an extrudate extruded from the die into a pre-defined shape.

In another aspect of the oven described herein, a transfer station is disposed within the heating chamber. The transfer station is operable to position the shape of the extrudate onto the pre-formed blank of the first fiber reinforced thermoplastic material.

Accordingly, recycled or scrap material may be fed into the extruder and used to partially form the workpiece, thereby reducing waste. Additionally, due to the properties of the extruded second fiber reinforced material, more complex features may be formed into the final shape of the workpiece, that were otherwise not possible using only a planar sheet of feedstock. Additionally, different material types may be combined to provide better material optimization for certain circumstances.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Referring to the FIGS., wherein like numerals indicate like parts throughout the several views, an oven is generally shown at 20. The oven 20 is used in a process of manufacturing a fiber reinforced thermoplastic workpiece, described in greater detail below.

Figure 1:
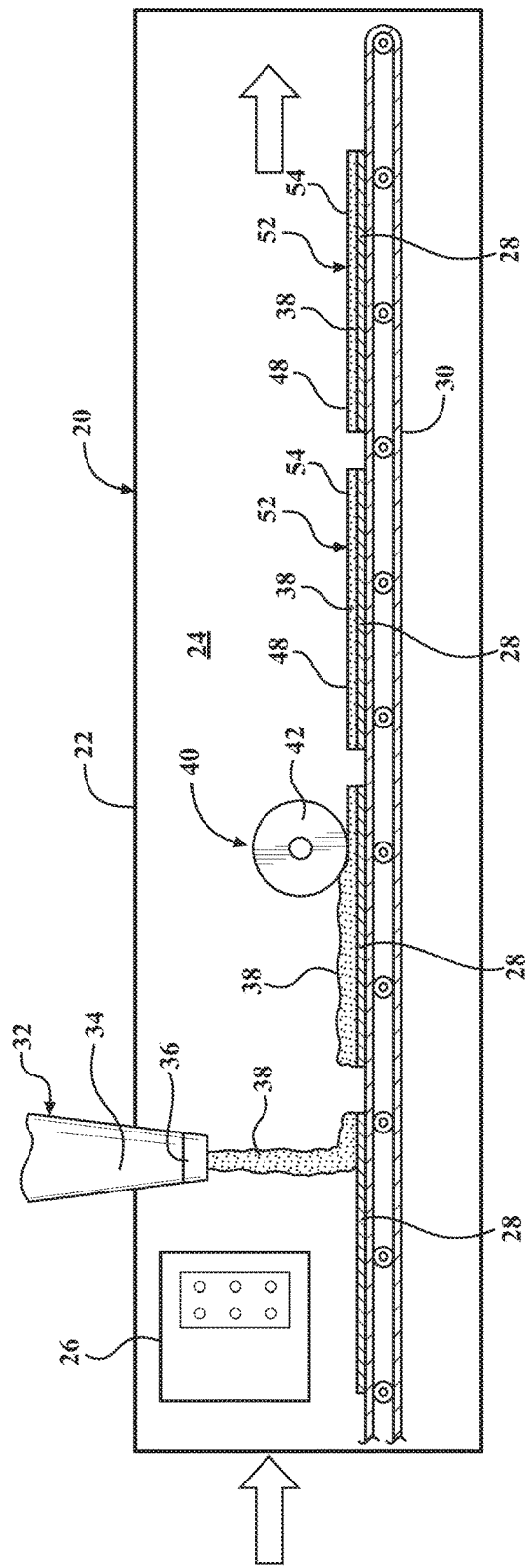
FIG. 1 is a schematic side view of a first embodiment of an oven.
Figure 2:
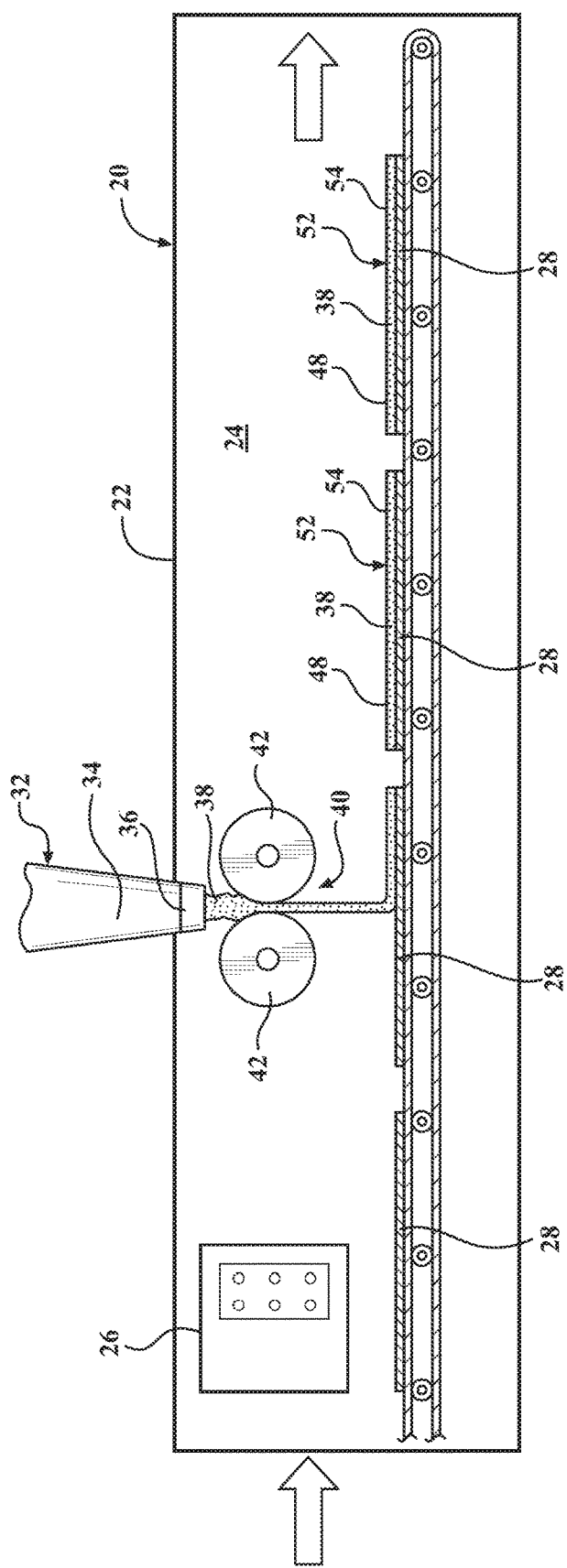
FIG. 2 is a schematic side view of a second embodiment of the oven.
Figure 3:
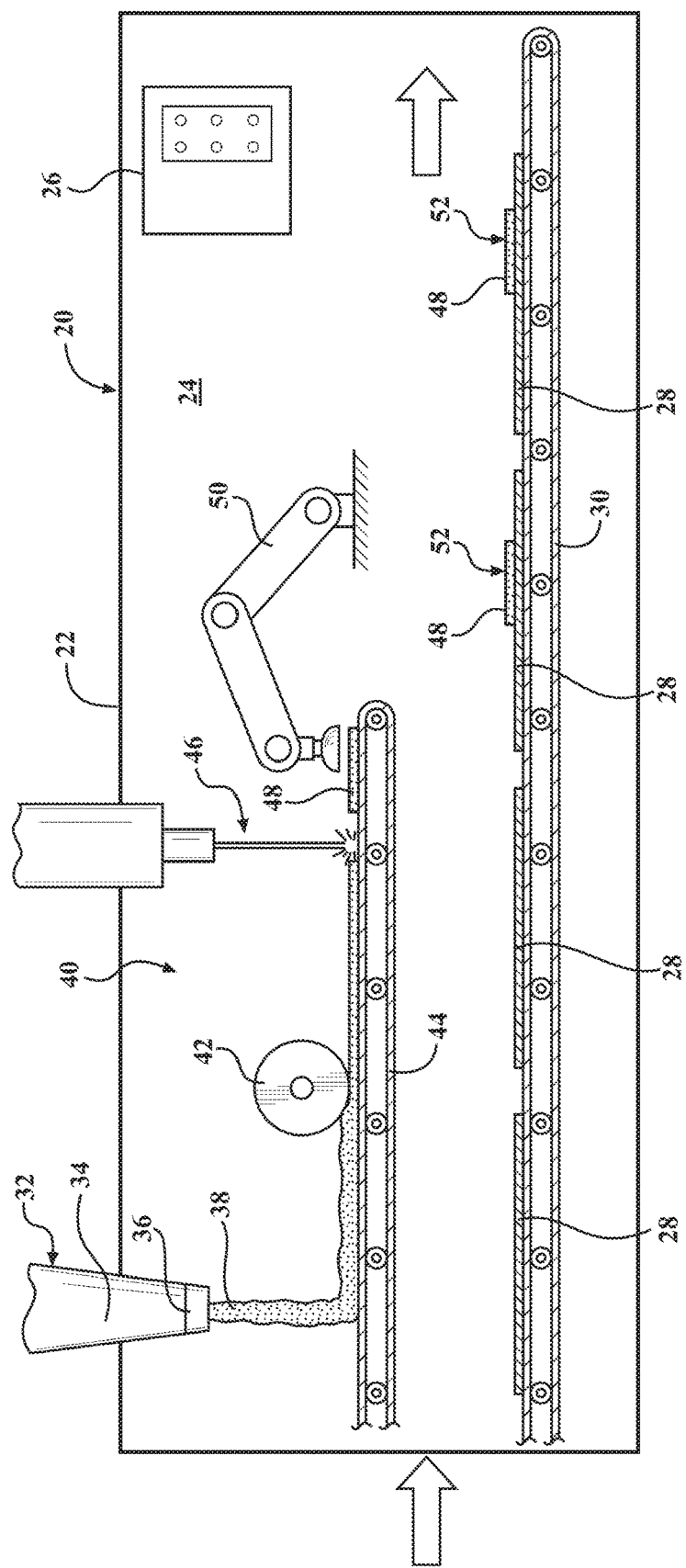
FIG. 3 is a schematic side view of a third embodiment of the oven.

Referring to FIGS. 1-3, different embodiments of the oven 20 are generally shown in each respective Figure. Features of the oven 20 that are common to the embodiments of the oven 20 are shown in the Figures and identified by the same reference numeral within each Figure. Features that are specific to less than all of the embodiments are specifically noted and described with reference to its respective embodiment and Figure.

Referring to FIGS. 1-3, the oven 20 includes a structure 22 defining a heating chamber 24. The structure 22 may include a plurality of walls, a roof, a floor, etc., which bound and form the heating chamber 24. The structure 22 of the oven 20 may be manufactured in a suitable manner, and from a suitable material capable of withstanding the heat used to heat thermoplastic materials to their respective melting temperature. The specific construction, size, configuration, etc., of the structure 22 are not pertinent to the teachings of this disclosure, and are therefore not described in detail herein. The heating chamber 24 includes a heating element 26 that is operable to heat a pre-formed blank 28 of a first fiber reinforced thermoplastic material to its melting temperature. The pre-formed blank 28 may be formed into a simple sheet 54, or may be pre-formed into a three dimensional object.

The oven 20 includes a conveyor system 30, which is used to move components through the heating chamber 24 of the oven 20. It should be appreciated that the structure 22 may include one or more doors or openings into the heating chamber 24 through which the conveyor system 30 passes. The conveyor system 30 may include rollers, tracks, stands, motors, belts, etc., able to support and transport components through the heating chamber 24. The specific construction, size, configuration, etc., of the conveyor system 30 are not pertinent to the teachings of this disclosure, and are therefore not described in detail herein.

The oven 20 further includes an extruder 32. The extruder 32 includes a heated hopper 34. The heated hopper 34 may be positioned outside of the heating chamber 24, inside of the heating chamber 24, or partially inside of the heating chamber 24. The heated hopper 34 is operable to heat a second fiber reinforced thermoplastic material to its melting temperature. The extruder 32 further includes a nozzle or die 36 that is operable to discharge the heated second fiber reinforced thermoplastic material as an extrudate 38. As used herein, the term extrudate 38 is defined as material that has been extruded through the die 36 of the extruder 32. In one embodiment (not shown), the die 36 is positioned outside of the heating chamber 24. In other embodiments, such as shown in FIGS. 1-3, the die 36 is positioned inside of the heating chamber 24. The die 36 is in communication with the heated hopper 34, such that the heated hopper 34 supplies the heated second fiber reinforced thermoplastic material to the die 36 for extrusion therefrom. Extruders for use in the manufacture of fiber reinforced thermoplastic components are readily available, and the construction and operation of the extruder 32 is therefore not described in greater detail herein.

The oven 20 may further include a forming station 40. As shown in the Figures, the forming station 40 is disposed within the heating chamber 24. The forming station 40 is operable to form the extrudate 38 extruded from the die 36 into a pre-defined shape 48. The forming station 40 may include a device capable of forming, shaping, trimming, cutting, etc., the extrudate 38 of the second fiber reinforced thermoplastic material. For example, the forming station 40 may include one or more rollers or scrapers to flatten the extrudate 38 into a sheet 54 having a uniform thickness. The pre-defined shape 48 may include, for example, a sheet 54 of a substantially uniform thickness, or a three dimensional shape of a non-uniform thickness.

Referring to FIG. 1, the extruder 32 discharges or positions the extrudate 38 directly onto the pre-formed blank 28 of the first fiber reinforced thermoplastic material. The forming station 40 includes a single roller 42 that flattens the extrudate 38 into a sheet 54 directly on top of the pre-formed blank 28, after the extrudate 38 is positioned on the pre-formed blank 28 of the first fiber reinforced thermoplastic material. Notably, the extrudate 38 is formed and positioned on the pre-formed blank 28 of the first fiber reinforced thermoplastic material within the heating chamber 24 of the oven 20.

Referring to FIG. 2, the extruder 32 discharges or positions the extrudate 38 directly onto the pre-formed blank 28 of the first fiber reinforced thermoplastic material. The forming station 40 includes two rollers 42 that flatten the extrudate 38 into a sheet 54 therebetween before the extrudate 38 is positioned on the pre-formed blank 28 of the first fiber reinforced thermoplastic material. Notably, the extrudate 38 is formed and positioned on the pre-formed blank 28 of the first fiber reinforced thermoplastic material within the heating chamber 24 of the oven 20.

Referring to FIG. 3, the extruder 32 discharges the extrudate 38 onto a second conveyor system 44. The second conveyor system 44 moves the extrudate 38 to the forming station 40, which includes a roller 42 or scraper for forming the extrudate 38 of the second fiber reinforced thermoplastic material into a sheet 54 of a consistent thickness. The second conveyor system 44 then moves the formed sheet 54 of the extrudate 38 to a trimming station 46, which cuts, shapes, trims, etc., the sheet 54 of the extrudate 38 into a pre-defined shape 48. A transfer device 50 then moves the pre-defined shape 48 of the extrudate 38 from the second conveyor system 44 onto the pre-formed blank 28 of the first fiber reinforced thermoplastic material. Notably, the extrudate 38 is formed and positioned on the pre-formed blank 28 of the first fiber reinforced thermoplastic material within the heating chamber 24 of the oven 20.

Figure 4:
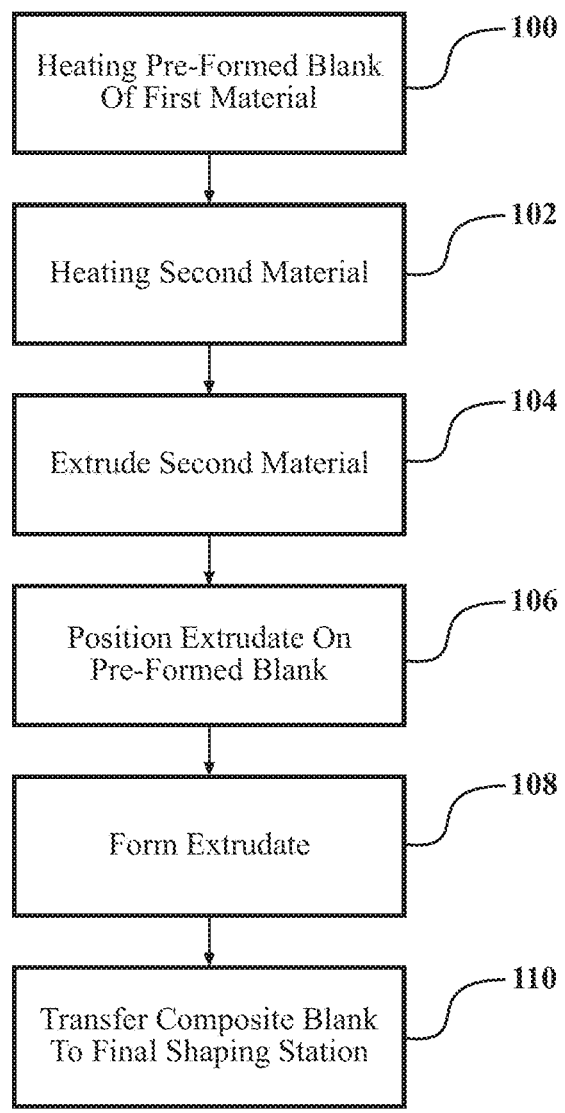
FIG. 4 is a flowchart representing a method of manufacturing a workpiece.

As noted above, the oven 20 may be used as part of a method of manufacturing a workpiece. Referring to FIG. 4, the method includes heating the pre-formed blank 28 of the first fiber reinforced thermoplastic material in the heating chamber 24 of the oven 20. The step of heating the pre-formed blank 28 is generally indicated by box 100 in FIG. 4. The first fiber reinforced thermoplastic material may include, but is not limited to, one of an amorphous or crystalline thermoplastic material that is reinforced with a fiber or powder that is compatible with the respective thermoplastic material. Examples of suitable thermoplastic materials include, but are not limited to polyamides and polypropylene. Examples of reinforcing materials include but are not limited to carbon fibers, glass fibers, and mineral fillers. As noted above, the heating chamber 24 includes a heating element 26 that is operable to heat the pre-formed blank 28 of the first fiber reinforced material to or near its melting temperature.

The second fiber reinforced thermoplastic material is heated in the heated hopper 34 of the extruder 32. The step of heating the second fiber reinforced thermoplastic material is generally indicated by box 102 in FIG. 4. The second fiber reinforced thermoplastic material may include, but is not limited to, one of an amorphous or crystalline thermoplastic material that is reinforced with a fiber or powder that is compatible with the respective thermoplastic material. Examples of suitable thermoplastic materials include, but are not limited to polyamides and polypropylene. Examples of reinforcing materials include but are not limited to carbon fibers, glass fibers, and mineral fillers. In one embodiment, the first fiber reinforced thermoplastic material and the second fiber reinforced thermoplastic material both include the same thermoplastic material and the same fiber reinforcing material. In another embodiment, the first fiber reinforced thermoplastic material and the second fiber reinforced thermoplastic material may include different thermoplastic materials and/or different fiber reinforcing materials.

The second fiber reinforced thermoplastic material may be chopped or processed into small pieces prior to being placed into the heated hopper 34 of the extruder 32. As such, the second fiber reinforced thermoplastic material does not need to be in sheet 54 form for this process. In one embodiment, the second fiber reinforced thermoplastic material is virgin material, i.e., new material that has not been salvaged or pre-processed. However, in another embodiment, the second fiber reinforced thermoplastic material is recycled or salvaged material. Accordingly, the process described herein may use scrap material that would otherwise be disposed of, as the second fiber reinforced thermoplastic material, because the second fiber reinforced thermoplastic material is processed into small pieces prior to being placed in the heated hopper 34.

The second fiber reinforced thermoplastic material is extruded from the extruder 32 to form the extrudate 38. The step of extruding the second material to form the extrudate 38 is generally indicated by box 104 in FIG. 4. In one embodiment, the second fiber reinforced thermoplastic material is extruded onto the pre-formed blank 28 of the first fiber reinforced thermoplastic material outside the heating chamber 24 of the oven 20. However, in another embodiment, such as shown in FIGS. 1-3, the second fiber reinforced thermoplastic material is extruded from the die 36 of the extruder 32 within the heating chamber 24 of the oven 20.

The extrudate 38 is positioned on the pre-formed blank 28 of the first fiber reinforced thermoplastic material to form a composite blank 52. The step of positioning the extrudate 38 on the pre-formed blank 28 is generally indicated by box 106 in FIG. 4. In one embodiment, the extrudate 38 may be positioned on the pre-formed blank 28 outside of the oven 20. However, in another embodiment, such as shown in FIGS. 1-3, the extrudate 38 is positioned on the pre-formed blank 28 of the first fiber reinforced thermoplastic material within the heating chamber 24 of the oven 20.

In one embodiment, such as shown in FIGS. 1 and 2, the extrudate 38 of the second fiber reinforced thermoplastic material is extruded from the die 36 of the extruder 32 directly onto the pre-formed blank 28 of the first fiber reinforced thermoplastic material. In another embodiment, such as shown in FIG. 3, the extrudate 38 of the second fiber reinforced thermoplastic material is extruded from the die 36 of the extruder 32 onto the second conveyor system 44, and then transferred onto the pre-formed blank 28 of the first fiber reinforced thermoplastic material at a later time.

The extrudate 38 of the second fiber reinforced thermoplastic material may be formed into a pre-form within the heating chamber 24 of the oven 20, either before or after the extrudate 38 is positioned on the pre-formed blank 28 of the first fiber reinforced thermoplastic material. The step of forming the extrudate 38 is generally indicated by box 108 in FIG. 4. While the flowchart of FIG. 4 shows the step of positioning the extrudate 38 on the pre-formed blank 28 (box 106) before the step of forming the extrudate 38 (box 108), it should be appreciated that these steps may be reversed, such that the extrudate 38 is formed prior to being positioned on the pre-formed blank 28. Forming the extrudate 38 into the pre-form may include, but is not limited to, forming the extrudate 38 into a sheet 54 having a substantially uniform thickness. Additionally, forming the extrudate 38 into the pre-form may include, but is not limited to, trimming the sheet 54 into a pre-defined shape 48. In one embodiment, the pre-defined shape 48 may be substantially identical to a shape of the pre-formed blank 28 of the first fiber reinforced thermoplastic material, such that the pre-defined shape 48 substantially covers the entirety of the pre-formed blank 28 of the first fiber reinforced thermoplastic material. In another embodiment, the pre-defined shape 48 may be substantially different than the shape of the pre-formed blank 28 of the first fiber reinforced thermoplastic material, such that the pre-defined shape 48 covers a portion of the pre-formed blank 28 of the first fiber reinforced thermoplastic material. Furthermore, it should be appreciated that the pre-defined shape 48 of the second fiber reinforced thermoplastic material may be specifically positioned or placed on the pre-formed blank 28 of the first fiber reinforced thermoplastic material to achieve a desired design configuration and/or construction.

Once the extrudate 38 of the second fiber reinforced thermoplastic material has been positioned on the pre-formed blank 28 of the first fiber reinforced thermoplastic material to form the composite blank 52, then the composite blank 52 may be transferred to a final shaping station. The step of transferring the composite blank 52 to the final shaping station is generally indicated by box 110 in FIG. 4. The composite blank 52 may be transferred to the final shaping station in a suitable manner, such as but not limited to manually transferring the composite blank 52, using a robotic arm to transfer the composite blank 52, etc. The final shaping station may include a machine or device capable of forming the composite blank 52 into the final shape of the workpiece. For example, the final shaping station may include, but is not limited to, a die press, a mold, etc. The specific type, configuration, and operation of suitable final shaping stations are not pertinent to the teachings of this disclosure, and are therefore not described in detail herein.

Because the second fiber reinforced thermoplastic material is positioned on the pre-formed blank 28 of the first fiber reinforced thermoplastic material, while both are still in the heating chamber 24 of the oven 20, the amount of time it takes to transfer both from the heating chamber 24 into the final shaping station is reduced, thereby enabling the composite blank 52 to maintain as much heat as possible, which improves the formation of the final workpiece in the final shaping station.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of manufacturing a composite blank, the method comprising:
    heating a pre-formed blank of a first fiber reinforced thermoplastic material in an oven;
    heating a second fiber reinforced thermoplastic material in an extruder;
    extruding the second fiber reinforced thermoplastic material from the extruder to form an extrudate;
    positioning the extrudate on the pre-formed blank of the first fiber reinforced thermoplastic material within the oven to form the composite blank; and
    transferring the composite blank to a final shaping station.

2. The method set forth in claim 1, wherein the extrudate of the second fiber reinforced thermoplastic material is extruded from the extruder directly onto the pre-formed blank of the first fiber reinforced thermoplastic material.

3. The method set forth in claim 1, further comprising forming the extrudate of the second fiber reinforced thermoplastic material into a pre-form within the oven.

4. The method set forth in claim 3, wherein forming the extrudate into the pre-form is further defined as forming the extrudate into the pre-form before positioning the extrudate on the pre-formed blank of the first fiber reinforced thermoplastic material.

5. The method set forth in claim 3, wherein forming the extrudate into the pre-form is further defined as forming the extrudate into the pre-form after positioning the extrudate on the pre-formed blank of the first fiber reinforced thermoplastic material.

6. The method set forth in claim 3, wherein forming the extrudate into the pre-form includes forming the extrudate into a sheet.

7. The method set forth in claim 6, wherein forming the extrudate into the pre-form includes trimming the sheet into a pre-defined shape.

8. The method set forth in claim 7, wherein positioning the extrudate of the second fiber reinforced thermoplastic material on the pre-formed blank of the first fiber reinforced thermoplastic material includes placing the pre-defined shape of the extrudate on the pre-formed blank of the first fiber reinforced thermoplastic material.

9. The method set forth in claim 1, wherein the first fiber reinforced thermoplastic material and the second fiber reinforced thermoplastic material each include one of glass fibers or carbon fibers.

10. The method set forth in claim 1, wherein the first fiber reinforced thermoplastic material and the second fiber reinforced thermoplastic material each include one of a polyamide or polypropylene material reinforced with one of carbon fibers, glass fibers, or mineral fillers.

11. The method set forth in claim 1, wherein the second fiber reinforced thermoplastic material is virgin material.

12. The method set forth in claim 1, wherein the second fiber reinforced thermoplastic material is recycled material.

13. A method of manufacturing a composite blank, the method comprising:
    heating a pre-formed blank of a first fiber reinforced thermoplastic material in an oven;
    heating a second fiber reinforced thermoplastic material in an extruder;
    extruding the second fiber reinforced thermoplastic material from the extruder, within the oven, to form an extrudate;
    positioning the extrudate on the pre-formed blank of the first fiber reinforced thermoplastic material, within the oven, to form the composite blank; and
    transferring the composite blank to a final shaping station.

14. The method set forth in claim 13, further comprising forming the extrudate of the second fiber reinforced thermoplastic material into a pre-form before positioning the extrudate on the pre-formed blank of the first fiber reinforced thermoplastic material.

15. The method set forth in claim 13, further comprising forming the extrudate of the second fiber reinforced thermoplastic material into a pre-form after positioning the extrudate on the pre-formed blank of the first fiber reinforced thermoplastic material.

16. A method of manufacturing a composite blank, the method comprising:
    heating a pre-formed blank of a first fiber reinforced thermoplastic material in an oven;
    heating a second fiber reinforced thermoplastic material in an extruder;
    extruding the second fiber reinforced thermoplastic material from the extruder to form an extrudate;
    forming the extrudate of the second fiber reinforced thermoplastic material into a pre-form within the oven;
    positioning the extrudate on the pre-formed blank of the first fiber reinforced thermoplastic material to form the composite blank; and
    transferring the composite blank to a final shaping station.

17. The method set forth in claim 16, wherein extruding the second fiber reinforced thermoplastic material is further defined as extruding the second fiber reinforced thermoplastic material in the oven.

* * * * *